(No Model.)
J. BARDET.
CHAIN GEARING.
No. 547,319. Patented Oct. 1, 1895.
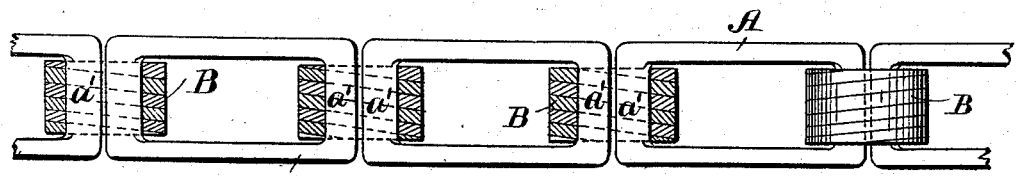
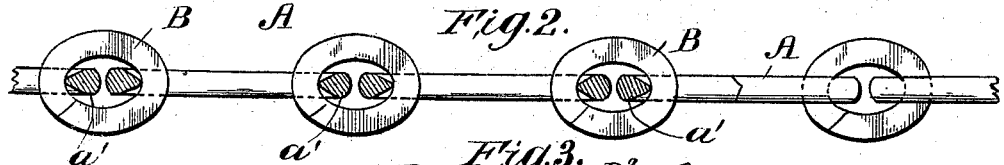
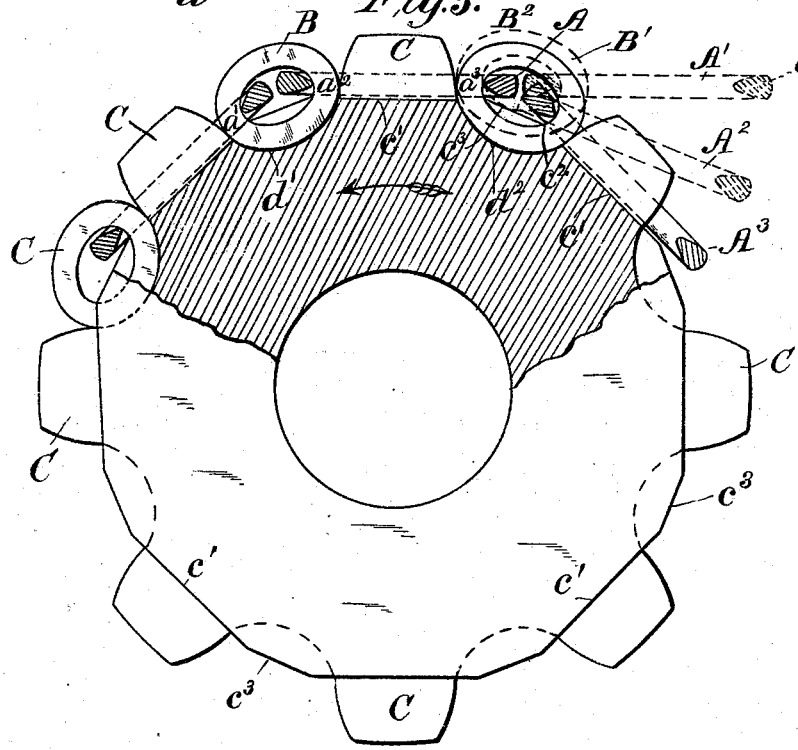
Witnesses:
W. E. Bowen
H. C. Pinckney
Inventor
Jean Bardet
By J. E. M. Bowen
Atty.

UNITED STATES PATENT OFFICE.

JEAN BARDET, OF PARIS, FRANCE.

CHAIN-GEARING.

SPECIFICATION forming part of Letters Patent No. 547,319, dated October 1, 1895.

Application filed October 19, 1893. Serial No. 488,576. (No model.) Patented in France June 14, 1893, No. 230,843, and in England June 27, 1893, No. 12,631.

*To all whom it may concern:*

Be it known that I, JEAN BARDET, civil engineer, of 39 Rue Bouret, Paris, in the Republic of France, have invented certain new and useful Improvements in Chain-Gearing, (for which I have obtained Letters Patent of France for fifteen years, No. 230,843, dated June 14, 1893, and of Great Britain, No. 12,631, dated June 27, 1893;) and I do hereby declare that the following is a full and exact description thereof, reference being made to the accompanying drawings.

My invention relates to a chain and a sprocket-wheel engaging therewith for the transmission of power, and adapted particularly for the transmission of the motion of the pedals to the driving-wheel of cycles.

In the accompanying drawings, Figure 1 represents a ground plan of the chain; Fig. 2, a longitudinal elevation of the chain partly in section. Fig. 3 shows the sprocket-wheel partly in vertical section, with the chain shown in longitudinal section; and Fig. 4 represents a ground plan of a sprocket-wheel.

Corresponding letters refer to corresponding parts in the several views of the drawings.

The said chain consists of two types of pieces only—that is to say, the pieces A or inks of rectangular form, the ends $a'$ of which are in the inside made wedge or blade shaped with rounding edges, and the pieces B, connecting the pieces or links A together, the said pieces B being spiral springs preferably of an oval form or shape, made of square, rectangular, or other wire, the coils of which touch each other.

To put the chain together the ends of two links A are placed near each other and the spring is threaded over the side of the links by spreading out the first turns of the said springs, so that the spring passes entirely into the link in the same way as a key is placed into a split ring, the spring lending itself to the operation by its elasticity. The third, fourth, and following links are connected in the same way until the last one, the chain being finished by connecting the two end links with the same spring.

As will be seen, the said chain possesses the following advantages: As there is no riveting the said chain can be made in tempered steel, which makes it wear for a very considerable time and also allows of its being very light, the steel acquiring, through being tempered, a very great resistance against rupture. It works without friction, the parts $a'$ of the links A rolling on the inside of the springs B in the same way as the blade of a pair of scales, the rolling motion of the links being obtained by the peculiar construction of the pinion hereinafter described.

The chain can be repaired readily, and when used in connection with bicycles and tricycles by the rider himself when on the road. When a link happens to break it can be immediately replaced by another if care has been taken by the rider to provide himself with a few spare links.

The said chain can run in the mud or dust on account of the amount of space between the spring and the link A, and on account of there being no friction when the chain bends, but simply a rolling motion over the blade-like part of the link.

The chain consists of only two kinds of pieces, which is a great advantage in a manufacturing point of view.

The said chain can be taken to pieces at any time to see the state it is in with respect to wear. It has two axes on which to bend for one element of chain, which is an advantage over the roller-chain. The flat links A can be either stamped, cut out, or cast in steel, whether tempered or not, or in any other material, and any kind of manufacture and any kind of suitable material may be adopted for the springs forming the intermediate links B.

In order to secure the rolling of the chain when turning round the sprocket-wheel, it is necessary to cause the pieces A and B to bear on the sprocket-wheel, so that the line $a'$ $a^2$, Fig. 3, which connects the blade-like parts of two consecutive flat links shall be the major axis of the spring. The piece A bears on the outside on the flanges $c'$ on both sides of the teeth C of the sprocket-wheel, and the piece B on the curved surfaces of the pockets formed by the depressions between the teeth and the flanges of the chain-wheel. The portions of the flanges opposite the central parts of the depressions between the teeth are indicated by $c^3$.

When the portion of the chain stretched out between the two wheels of a bicycle is drawn toward one of said wheels, the positions of one of the horizontal and one of the vertical links vary with reference to the nearest tooth with which operative contact is about to be established, these relative positions, as successively assumed by the said links, being illustrated in Fig. 3, in the case of the vertical link by the positions indicated by $B'$ and $B^2$ and in the case of the horizontal link by $A'$, $A^2$, and $A^3$, it being of course understood that as the sprocket-wheel turns in the direction of the arrow, the part of the chain about to come in contact with the wheel will continue in the horizontal directions $A' B'$ until the nearest tooth approaching it has come in operative contact therewith, while in Fig. 3, for the purpose of greater clearness, the opposite condition has been assumed and illustrated. The chain-link $A$, already in operative contact with one of the teeth and the two succeeding links, will successively occupy the three relative positions indicated by $A B'$ $A'$, $A B^2 A^2$, and $A B^2 A^3$. In changing from position $A B' A'$ to $A B^2 A^2$ the vertical link turns around ridge $a^3$, such vertical link maintaining with the succeeding horizontal link the previous relative position while coming in operative contact with recess $d^2$; but in changing from position $A B^2 A^2$ to $A B^2 A^3$, links $A$ and $B^2$ maintain their relative positions, the succeeding links, however, continuing to turn while bearing against the ridge $c^2$, which ridge is formed by adjoining sloping parts of the flanges. It then comes to $A^3$, when the following link goes through the same phases of motion. The said chain is equipoised on the sprocket-wheel, seeing that forces to which the different pieces are subjected are normal on the bearing-surfaces. The eyes of vertical links $B$ exceed in length the widths of two cross-pieces of two adjoining horizontal rectangular links $A$. This permits said two cross-pieces to assume varying and inclined positions with reference to each other within such eye without their interfering with each other or with the inner walls of said eye. The spiral springs forming the vertical links are coiled closely, so as to form, when in their operative positions, a substantially continuous body extending along the cross-pieces of the horizontal links, and I thus provide, by the use of a single closely-coiled spring, a link utilizing to the fullest extent the strength of the metal composing it in the direction in which the link is subjected to strain, and am enabled at one operation to perfect the connection of a horizontal with a vertical link.

Having thus described my invention, what I claim as new, and desire to secure by Letters Patent, is—

1. In chain gearing, the combination with a sprocket wheel having flanges on both sides of its teeth, and also on both sides of the depressions between said teeth, the teeth projecting radially beyond their flanges, and the outer surfaces of the flanges being straight and continuous along and beyond the teeth, of a chain comprising links having their central longitudinal portions resting on such flanges, and intermediate links fitting the depressions between the teeth, substantially as set forth.

2. In chain gearing, the combination with a sprocket wheel having straight flanges on both sides of its teeth with extensions along the pockets formed between said teeth, the teeth projecting outward beyond their flanges, of a chain comprising straight links adjusted to rest on said flanges and their extensions, and curved intermediate links fitting into said depressions, substantially as set forth.

3. In chain gearing, a sprocket wheel provided with flanges on both sides of its teeth, said teeth extending beyond adjoining parts of the flanges and the depressions between said teeth forming pockets between the flanges, in combination with a chain the links of which fit around such teeth and into such pockets, substantially as set forth.

In witness whereof I have hereunto set my hand in presence of two witnesses.

JEAN BARDET.

Witnesses:
GEORGE LAURENTZ,
CLYDE SHROPSHIRE.